United States Patent [19]

Mein

[11] Patent Number: 4,469,670

[45] Date of Patent: Sep. 4, 1984

[54] PROCESS FOR RECOVERING CESIUM FROM CESIUM ALUM

[75] Inventor: Peter G. Mein, LaSalle, Ill.

[73] Assignee: Carus Corporation, LaSalle, Ill.

[21] Appl. No.: 512,925

[22] Filed: Jul. 12, 1983

[51] Int. Cl.$^3$ ............................................. C01B 1/02
[52] U.S. Cl. .................................. 423/599; 423/184; 423/421
[58] Field of Search ............... 423/599, 600, 499, 179, 423/184, 421, 199

[56] References Cited

U.S. PATENT DOCUMENTS

| | | | |
|---|---|---|---|
| 956,120 | 4/1910 | Machalske | 423/599 |
| 1,281,085 | 10/1918 | Shoeld | 423/599 |
| 2,481,455 | 9/1949 | Stenger | 423/499 |
| 2,504,130 | 4/1950 | Jaskowiak | 423/599 |
| 2,808,313 | 10/1957 | Fleischmann | 423/499 |
| 2,940,822 | 6/1960 | Carus et al. | 423/599 |
| 3,112,169 | 11/1963 | Berthold et al. | 423/117 |
| 3,207,571 | 9/1965 | Berthold | 423/600 |
| 3,489,509 | 1/1970 | Johnson | 423/499 |

FOREIGN PATENT DOCUMENTS

| | | | |
|---|---|---|---|
| 1323932 | 3/1963 | France | 423/499 |
| 0128454 | 4/1959 | U.S.S.R. | 423/421 |
| 0504704 | 5/1976 | U.S.S.R. | 423/421 |

OTHER PUBLICATIONS

J. J. Kennedy, *Chemical Reviews*, vol. 23 (1938), pp. 157–163.

Kirk–Othmer, *Encyclopedia of Chemical Technology*, vol. 5, Third Edition (1979), pp. 327–338.

Vydrik et al., *Inorg. Mater.* (U.S.A.), vol. 8, No. 2, (Feb. 1972), pp. 366, 367.

*Primary Examiner*—Wayne A. Langel

[57] ABSTRACT

Cesium is recovered from cesium alum, $CsAl(SO_4)_2$, by an aqueous conversion and precipitation reaction using a critical stoichiometric excess of a water-soluble permanganate to form solid cesium permanganate ($CsMnO_4$) free from cesium alum. The other metal salts remain in solution, providing the final pH does not cause hydroxides of aluminum or iron to form. The precipitate is separated from the residual solution to obtain $CsMnO_4$ of high purity.

13 Claims, No Drawings

PROCESS FOR RECOVERING CESIUM FROM CESIUM ALUM

BACKGROUND AND PRIOR ART

The field of this invention relates to the recovery of cesium from cesium-bearing minerals such as pollucite. More specifically, this invention relates to an improvement in such recovery processes wherein the cesium ore is extracted with sulfuric acid to obtain an extract containing cesium alum, $CsAl(SO_4)_2$ for further processing.

Processes for the recovery of cesium from pollucite and other cesium-containing minerals were reviewed by J. J. Kennedy in *Chemical Reviews*, Vol. 23 (1938), pages 157–163. More recent technical developments were summarized by R. A. Heindl, *Bureau of Mines Bulletin* 650, "Mineral Facts and Problems" (1970 Ed.), pages 527–534.

In one process which has undergone considerable development for commercial use, ground pollucite ore is leached with strong sulfuric acid to obtain an extract containing cesium alum, which is recovered by crystallization. The cesium alum is redissolved in water at an elevated temperature, and reacted with an alkaline earth metal hydroxide, such as $Ba(OH)_2$ or $Ca(OH)_2$, to form an aluminum hydroxide precipitate together with precipitated $BaSO_4$ or $CaSO_4$. Cesium sulfate remains in the supernatant solution from which it can be recovered and converted into other cesium compounds. See Kirk-Othmer, *Encyclopedia of Chemical Technology*, Vol. 5, page 331 (3rd ed., 1979); U.S. Pat. Nos. 3,112,169 and 3,207,751; and *Chemical Reviews*, cited above, page 161.

Cesium alum is cesium aluminum sulfate hydrate. Its formula can be expressed as $CsAl(SO_4)_2.12H_2O$, or as $Cs_2SO_4 \cdot Al_2(SO_4)_3.24H_2O$. The cesium alum as contained in the sulfuric acid extracts of pollucite is contaminated with other metal ions, such as rubidium, sodium, potassium, and iron. The crystallization of the cesium alum effects substantial purification, but the precipitate will contain at least trace amounts of other alums, such as rubidium alum, and other metal compounds such as iron sulfate. On redissolving the cesium alum precipitate, there is a need to separate not only the cesium from the aluminum but also from any other metal ions present as well as metal ions added in the precipitating agent.

While the cesium alum process is capable of producing cesium sulfate of relatively high purity, the process has proven to be difficult and expensive for commercial application. Therefore, there has been a recognized need for an improved process for recovering cesium from pollucite in a highly purified form. The need for such a process improvement has been emphasized in recent years by the increasing uses of cesium and cesium compounds, and by the projected expansion of these uses in anticipated applications. (See Heindl, above cited, pages 528–532.)

SUMMARY OF INVENTION

The process of the present invention can be regarded as an improvement in the traditional cesium alum process. The pollucite or other cesium-bearing mineral, prepared in a finely divided condition and extracted with concentrated sulfuric acid, following known prior art procedures. The cesium alum is recovered from the extract by crystallization. The cesium alum material may comprise a redissolved precipitate of cesium alum, prepared in accordance with well-known procedures.

Stated broadly, the improvement comprises a process for recovering cesium from cesium alum, $CsAl(SO_4)_2$, by an aqueous conversion and precipitation reaction. A precipitate of cesium permanganate ($CsMnO_4$) is formed by using a stoichiometric excess of water-soluble permanganate salt to cesium in the aqueous reaction solution. Potassium permanganate is a preferred reagent, but other water-soluble permanganate salts can be used. By employing at least 1.5 moles of permanganate ion per mole of cesium, cesium alum can be quantitatively converted to cesium permanganate, which can be recovered in high purity.

The reaction is carried out at a temperature above 35° C., such as preferably at a temperature of about 40–80° C. In one preferred embodiment, solid cesium alum is added to a hot aqueous solution of permanganate. As the cesium alum dissolves, it reacts and is converted to the cesium permanganate, which precipitates as the reaction proceeds. After all of the cesium alum has dissolved and reacted, there will be residual cesium permanganate in solution, which can be recovered by reducing the temperature of the solution. The final pH is below a pH at which aluminum hydroxide, $Al(OH_3)$ forms and precipitates. The fully precipitated cesium permanganate is recovered by filtration or centrifugation. Separation of the $CsMnO_4$ precipitate from the residual solution of the excess permanganate, aluminum, and other metal ions produces a cesium product of high purity, viz. above 98%. Cesium permanganate may be converted into other cesium compounds.

By reacting the cesium permanganate with a permanganate reducing agent, cesium carbonate ($Cs_2CO_3$) can be formed together with cesium delta manganese dioxide. In one procedure for carrying out this reduction, a slurry of the $CsMnO_4$ is formed in an aqueous alkaline solution containing the reducing agent, which conveniently may be a water-soluble organic compound such as methanol. The resulting cesium carbonate solution can be separated from the solid-phase cesium delta manganese dioxide. The cesium carbonate may be recovered by evaporation and crystallization. Cesium can be removed from the cesium delta manganese dioxide by ion exchange using aqueous solutions of strong mineral acids or polyvalent metal salts of such acids. In this way, other commercially desirable inorganic salts of cesium may be easily obtained.

DETAILED DESCRIPTION

The preferred mineral for preparing the cesium alum is pollucite ore. However, other cesium-bearing minerals can be used as starting materials, although they are of lower cesium content, such as lepidolite and carnallite.

The content of cesium in crude pollucite ore varies over a considerable range, such as from 5 to 32 weight percent $Cs_2O$. Although not required for the purpose of the present invention, the cesium content of the starting material for the extraction may be upgraded by froth flotation to separate the pollucite from non-pollucite minerals. See Kirk-Othmer, *Encyclopedia of Chemical Technology*, Vol. 5, 327–338, at 330, (3rd ed., 1979).

The theoretical structure of pure pollucite is $Cs_2OAl_2O_3.4SiO_2$. Natural pollucite, however, contains varying amounts of rubidium, potassium, and sodium in the pollucite crystal structure, the $Cs_2O$ being replaced by $Rb_2O$, $K_2O$, or $Na_2O$. Natural pollucite also contains some iron, usually in the form of an iron oxide. Crude pollucite ore is a heterogeneous material. It is therefore an advantage of the process of the present invention that no upgrading of crude pollucite ore is required.

The crude pollucite ore, upgraded pollucite, or other cesium-bearing mineral is crushed and ground to a state of fine subdivision. For example, particle size may be minus 200 mesh (American Standard Screen). It will be understood, however, that the exact particle size is not critical. A fine state of subdivision is advantageous to facilitate rapid contacting of the sulfuric acid with the cesium values to be solubilized.

The finely divided cesium-bearing starting material is subjected to a leaching-type digestion with aqueous sulfuric ($H_2SO_4$) acid. For example, stainless steel or glass-lined reaction vessel equipped with an agitator can be used. The amount of $H_2SO_4$ present will be generally somewhat in excess of the minimum amount required to react with the cesium and other metals forming soluble sulfates.

The conditions for the extraction of the cesium in the form of a cesium alum solution, and the recovery of the cesium alum as a crystalline precipitate may be in accordance with any of the prior art processes or commercial processes which have been used to carry out these steps. For example, suitable processing conditions for these steps are described in U.S. Pat. Nos. 3,112,169 and 3,207,571. Further, relatively pure cesium alum is available as a commercial product, which can be purchased and used as a starting material for the process improvement of the present invention.

The cesium alum precipitate prepared from pollucite ore will contain silica. However, the cesium alum crystals will be of relatively large size, such as +100 mesh, while the silica particles will be of a much finer size, such as −200 mesh. The cesium alum crystals can therefore be retained on a 100 mesh sieve while the silica particles are washed through the sieve, thereby obtaining cesium alum of relatively low silica content.

For carrying out the first step of the process of this invention, the cesium alum is reacted in an aqueous solution with a water-soluble permanganate. In one preferred procedure, cesium alum solids are added to a preformed aqueous solution of the permanganate. In an alternative procedure, the cesium alum is dissolved in water, and the permanganate is added thereto, either as a solid, or as a concentrated aqueous solution. By adding the cesium alum solids to the solution of the permanganate, much less volumes of water can be used for converting the same amount of cesium alum to cesium permanganate ($CsMnO_4$).

The conversion reaction is carried out at a temperature above 35° C., and preferably at a temperature of from about 40° to 80° C. Higher temperatures up to the boiling point of the solution can be used, but are not needed. The concentration of the permanganate ion may vary over a wide range. With $KMnO_4$ desirable concentrations range from 2 to 25 weight percent. More generally, the permanganate ion molarity may range from 0.13 to 1.80. In the procedure where the cesium alum solids are added to the permanganate solution, the use of higher temperatures favors the rapid dissolving of the cesium alum and therefore accelerates the rate of the conversion. As the cesium alum dissolves, it is converted very rapidly to the cesium permanganate which continuously precipitates. The precipitate may be in contact with undissolved cesium alum. The solids are stirred so that the cesium alum continues to dissolve. When all of the cesium alum has dissolved and has been converted, the precipitated solids will be substantially free of the cesium alum.

In the alternative embodiment where a solution of the cesium alum is formed and the permanganate is added thereto, higher temperatures are desirable so that more cesium alum will be in solution, the saturation concentration increasing with temperature. However, even at temperatures above 80° C., the amount of cesium alum which can be retained in a saturated water solution is much less than that which can be reacted by adding it as a solid to a solution of potassium permanganate.

Any water-soluble permanganate salt can be used, since it is the permanganate ion which reacts with the cesium to form the precipitate. Potassium permanganate ($KMnO_4$) is the preferred reagent because of its availability and lower cost as compared with other metal permanganates. The metal cation of the permanganate salt should not be one which forms an insoluble percipitate with sulfate. For this reason, alkaline earth metal permanganates such as calcium or barium are not desirable.

In order to obtain the cesium permanganate precipitate free of cesium alum solids, it is necessary to employ an excess of the permanganate ion in relation to the cesium to be converted to the cesium permanganate. Preferably, at least 1.5 moles of permanganate ion should be employed per mole of cesium. While amounts of permanganate up to 3.0 moles or more per mole of cesium can be used, such very high ratios are not required. An optimized range appears to be from about 1.8 to 2.5 moles of permanganate ion per mole of total cesium.

The critical pH for the reaction is the final pH on completion of the formation of the $CsMnO_4$. The final pH should be sufficiently low to maintain the aluminum and, if present, the iron, in solution. Aluminum begins to precipitate as aluminum hydroxide, $Al(OH)_3$, at a pH of around 4.0. Iron may precipitate as iron hydroxide, $Fe(OH)_3$, at a pH in the range of 3 to 4. Usually very little iron will be present so a final pH of below 4.0 is usable, such as pH's from 1.0 to 3.8. Where required an acid can be added such as sulfuric acid or hydrochloric as to lower the pH.

Where the solid cesium alum is added to a solution of $KMnO_4$, the starting pH may be in the range from 6 to 8. As the cesium alum dissolves and reacts, the pH will progressively decline. With continued stirring any precipitated hydroxides will redissolve and therefore do not interfere. Usually, a final pH below 4.0 will be obtained without the need for pH adjustment.

With the procedure starting with a solution of cesium alum, the initial pH will be acidic (pH 2–3.5). The pH will increase as the reaction proceeds, but the pH should not rise to a final pH at which $Al(OH)_3$ precipitates. Usually, however, no pH adjustment will be required.

After the completion of the conversion of the cesium alum to cesium permanganate, most of the cesium permanganate will be in the form of a solid crystalline precipitate. However, the supernatant will contain some additional cesium permanganate up to its saturation concentration at the temperature of the reaction. This additional cesium permanganate can be recovered by cooling the solution to a temperature below 25° C., such as a temperature from 15° to 20° C. The conversion reaction and the cooling precipitation can be carried out in the same vessel. The vessel may be equipped with heating and cooling means, and also with means for stirring solids in the reaction solution. After the completion of the precipitation, the cesium permanganate can be recovered by filtration or centrifugation. The aluminum and other alkali metal ions will remain in the solution.

The conversion reaction can be represented by the following equation:

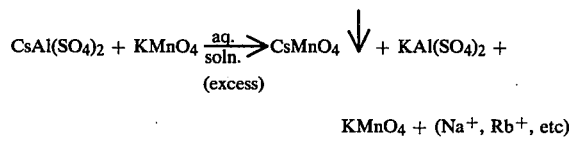

$$CsAl(SO_4)_2 + KMnO_4 \xrightarrow[\text{soln.}]{\text{aq.}} CsMnO_4 \downarrow + KAl(SO_4)_2 +$$
(excess)
$$KMnO_4 + (Na^+, Rb^+, etc)$$

It will be understood that the foregoing equation represents the conversion reaction by which cesium permanganate is formed in both embodiments of the process. Whether the cesium alum is added as a solid or is in a preformed solution, the reaction occurs in solution between the cesium ions and the permanganate ions. The "excess" permanganate refers to the total molar ratio of permanganate to the total cesium for both embodiments.

The process improvement of the present invention is further illustrated by the following detailed examples:

EXAMPLE I

Preparation of Cesium Alum 6.12 kg pollucite (22.2% Cs, 2.55% Rb, 1.42% Na, 0.68% K, 9.42% Al, 25% Si) ball-milled to a particle size of minus 200 mesh were added to 7.9 kg 55% $H_2SO_4$ in a 76 l 3-neck round glass flask in a heating mantle. The reaction mixture was heated to 120° C. and moderately agitated. After 4 hours 30.6 kg boiling water were gradually added. After another hour the agitation was stopped and the reaction mixture was allowed to cool to room temperature within 48 hours. The pH of the reaction mixture was found to be 1.8. The reaction mixture containing large cesium alum crystals was put through a 100 mesh sieve. Most of the fine silica particles and the liquid were flushed through it retaining only the large cesium alum contaminated with only a little $SiO_2$ on the sieve. The cake was washed with 30 l water and obtained were 6.2 kg crude cesium alum. The crude cesium alum was air-dried to remove 9% moisture. The analysis of the air-dried product, consisting now of 5.64 kg, was as follows: 21.7% Cs, 0.38% Rb, 0.34% Na, 0.09% K and 4.78% Al. The cesium extraction yield at this point was 90%.

2.82 kg of the air-dried crude cesium alum were dissolved in 13 l water containing 7 g/l $CsAl(SO_4)_2.12$ $H_2O$ at 90° to 100° C. The solution was filtered hot through a medium-porosity heated filter funnel. The filtrate was allowed to cool to room temperature to bring about the crystallization of the cesium alum. The solids were separated from the liquid, the cake was washed with 1.5 l cold water and obtained were 2.94 kg wet purified cesium alum. The product contained 89% $CsAl(SO_4)_2.12$ $H_2O$ and 11% free water. The purity of the product was greater than 99%. Assuming the entire 5.64 kg crude cesium alum would have been crystallized, only half the quantity was used, so the cesium yield at this point calculates to still 90%. The material was air-dried and the analysis was as follows: 24.14% Cs, 0.17% Rb, 0.19% Na, 0.01% K, 0.005% Fe and 4.9% Al.

EXAMPLE II

Preferred Reaction Procedure 500 g recrystallized cesium alum as obtained in Example I were reacted with 5.68 kg of 5.5% $KMnO_4$ solution (pH 7.2) for 1 hour at 65° C. The final pH was 3.1. The reaction mixture was allowed to cool to room temperature. The $CsMnO_4$ precipitate was separated from the liquid by filtration. 243 g wet filter cake and 5.767 l filtrate (0.22 g/l Cs, 0.052 g/l Rb, 0.026 g/l Na, 13 g/l K, 3.9 g/l Al) were obtained. The adherent solubles were removed from the filter cake by washing with 3.8 water. The wet filter cake was dried for several hours at 90° C. The dried product consisting now of 221 g $CsMnO_4$, was analyzed as follows: 52.3% Cs, 0.13% Rb, 0.043% Na, 0.26% K, 0.0062% Fe and 21.6% Mn. The assay of the dry $CsMnO_4$ was found to be 99.1%. The conversion of cesium from $CsAl(SO_4)_2.12$ $H_2O$ to $CsMnO_4$ was 98%.

EXAMPLE III

Alternative Reaction Procedure 500 g of the crude cesium alum as obtained in Example I (21.7% Cs, 0.38% Rb, 0.34% Na, 0.092% K, 4.78% Al, 0.0066% Fe, 0.0014% Mn, 0.0092% Ni, 7.8% $SiO_2$) were heated in 5 of water to 100° C. to dissolve the cesium alum. This mixture (pH 1.8) containing the dissolved cesium alum and the solid silica was filtered hot into 6.4 kg of 5.5% agitated $KMnO_4$ solution at room temperature. The solution was allowed to cool to room temperature. The final pH was about 3.2–3.3. The precipitate was separated by filtration and 280 g wet filter cake and 11.43 l filtrate(0.2 g/l Cs, 0.09 g/l Rb, 0.011 g/l Na, 7.2 g/l K, 2.0 g/l Al, 0.0008 g/l Fe, 5.6 g/l Mn, less than 0.0004 g/l Cu, less than 0.0012 g/l Ni), specific gravity 1.012, were obtained. The adherent solubles were removed from the filter cake by washing with 2.5 liters of water. The wet, washed $CsMnO_4$ was analyzed as follows: 50.55% Cs, 0.083% Rb, 0.0005% Na, 0.190% K, 0.019% Al, 0.0099% Fe, 20.90% Mn, less than 0.0004% Cu, less than 0.0015% Ni. It was dried for several hours at 90° C. Analysis of the dry $CsMnO_4$ was as follows: 52.41% Cs, 0.086% Rb, 0.0005% Na, 0.197% K, 0.020% Al, 0.010% Fe, 21.67% Mn, less than 0.0004% Cu, less than 0.0016% Ni. The assay of the dry $CsMnO_4$ was found to be 99.3%. The conversion of cesium from $CsAl(SO_4)_2.12$ $H_2O$ to $CsMnO_4$ was 98%.

Further Processing Steps

The cesium permanganate prepared as described above may be sold as a commercial product, or it may be further processed to prepare other commercially desirable cesium compounds. Such further processing involves an initial key reaction in which the cesium permanganate is reacted with a permanganate reducing agent. The products of the reduction are cesium carbonate, which is a commercial product, and also cesium delta manganese dioxide, from which cesium can be recovered. In preferred embodiments, therefore, such further processing is a desirable part of the present invention, and will now be described in further detail.

Cesium permanganate can function as a solid-phase oxidizing agent, and can be reacted with virtually any oxidizable compound. The oxidizable compounds function as reducing agents, and may be reacted in liquid, gaseous, or solid-phase reactions, such reducing agents include compounds containing carbon, hydrogen, or both carbon and hydrogen, which are oxidized to carbon dioxide and/or water by permanganate. While the reducing agent may be in the form of a gas, such as carbon monoxide, or hydrogen gas, a presently preferred procedure is to use a water-soluble reducing agent, and to dissolve the reducing agent in an aqueous alkaline solution for contacting with the solid-phase cesium permanganate. Such water-soluble reducing agents include for example, starches, sugars, methanol,-formic acid, or formaldehyde.

Using an aqueous slurry, the solid particles of the cesium permanganate can be dispersed in water containing the dissolved reducing agent. The pH of the aqueous phase can range from 4 to 12, but a moderately alkaline pH is preferred, such as pH 8.0 to 10.0. The temperature of the reduction is not highly critical, but may range, for example, from 20° to 100° C. The presently preferred temperature is from about 60° to 80° C.

The reduction reaction using methanol as the reducing agent and an aqueous alkaline solution can be represented by the following equation.

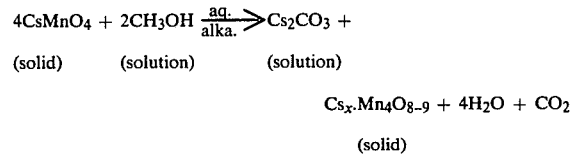

In the above equation, the cesium delta manganese dioxide product is represented by a generalized formula. The cesium content represented by the letter "x" may vary from 0.8 to 2 moles per each 4 moles of manganese, and the oxygen content may correspondingly vary from 8 to 9 moles of oxygen. To maximize the amount of cesium carbonate obtained and to minimize the amount of cesium associated with the manganese dioxide is a desirable objective. However, the cesium can be recovered from the delta manganese dioxide by treating this product with acids or metal salt solution to replace the cesium in an ion exchange-type reaction. By employing a reaction pH of from 4 to 7, and a temperature of from about 20° to 90° C., delta manganese dioxide can be obtained containing less than 1 mole of cesium per each 4 moles of manganese.

The aqueous solution of the cesium carbonate is separated from the reaction solids, comprising the cesium delta manganese dioxide, by centrifugation or filtration. Thereafter, the cesium carbonate can be recovered in solid form by evaporation and crystallization procedures.

The cesium remaining associated with the manganese dioxide may be recovered by treating the delta manganese dioxide with an acid or polyvalent metal salt solution. The acid or polyvalent metal salt solution may be selected so that the anion will form a desired salt with the cesium, such as sulfuric acid or manganese sulfate to obtain cesium sulfate, hydrochloric acid or manganese chloride to obtain cesium chloride, nitric acid or manganese nitrate to obtain cesium nitrate. These reactions are represented by the following equations (A) and (B) in which a delta manganese dioxide containing 2 moles of cesium per 4 moles of manganese is reacted with sulfuric acid or manganese sulfate to obtain cesium sulfate as the product.

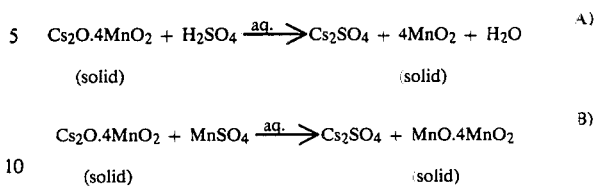

The reactions represented by the above equations are preferably carried out at temperatures of from about 20° to 50° C., but in certain embodiments temperatures up to 80° C. can be used. In the reaction of equation (A), since the acid is the reactant, the reaction will be carried out at an acid pH, usually a strong acid pH in the range from about 1 to 3. However, the reaction will proceed at any acid pH below 7.0. The reaction of equation (B) will also be at an acid pH below 7.0. The resulting manganate product will be in an acid form, which may be represented as: $MnO_2 \cdot xH_2O$.

In general, any strong acid can be used in the reaction of equation (A): in addition to sulfuric acid, the other mineral acids (viz. nitric, hydrochloric, etc.). Any water-soluble polyvalent metal salt of a strong mineral acid can be substituted for the $MnSO_4$, such as cobalt, copper or nickel sulfate, nitrate, or chloride. Equations (A) and (B) can be used as a reaction sequence where not all of the cesium is recovered by reaction (A). It is believed to be preferred, however, to employ only reaction (B), which can result when used without reaction (A) in a substantially complete recovery of the cesium.

The cesium sulfate solution as obtained in reactions (A) and (B) can be separated from the manganese dioxide solids by centrifugation or filtration. The cesium sulfate or other cesium salt can then be recovered by evaporation and crystallization procedures.

In an alternative process embodiment, the $CsMnO_4$ can be reduced with a solid or gaseous reductant, and the $Cs_2CO_3$ leached from the converted solids by aqueous extraction, leaving the cesium delta manganese dioxide as the residue, which can be further processed as described above.

Further processing of cesium delta manganese dioxide is illustrated by the following examples.

EXAMPLE IV 100 g $CsMnO_4$ (52.40% Cs, 21.66% Mn, 0.13% K, 0.07% Rb, 0.056% Al, 0.035% Na, 0.001% Fe) as prepared by the process of example I or II was suspended in 400 ml $H_2O$ in a 1 liter beaker. The suspension was stirred and its pH adjusted to 13 with 6.9 g CsOH in 14 ml water. It was heated to 60° C. and 12.7 g $CH_3OH$ in 12.7 ml water was gradually added within 45 minutes. The reaction mixture was stirred and kept at 60° C. for another 10 min. or until all seven-valent manganese was reduced to four-valent manganese. If the reduction of the $CsMnO_4$ is carried out at room temperature, the reduction process will be extended. The solids were separated from the liquid by filtration through a medium-porosity buchner filter funnel,it was washed with 50 ml water and 146 g filter cake (17.9% Cs, 14.85% Mn, 0.58% Rb) and 360 ml filtrate and wash (65.6 g/l Cs, 0.06 g/l Rb, 0.05 g/l K, 0.002 g/l Na, 0.0006 g/l Mn) were obtained. The cesium extraction from the $CsMnO_4$ is at this point 50% and the molar ratio Mn:Cs in the filter cake is as 1:0.5.

The $Cs_2CO_3$ in the filtrate can be recovered as such or be converted into any suitable cesium compound by addition of the corresponding acid followed by evaporation and crystallization.

The 146 g filter cake were suspended in 200 ml water and pH-adjusted to 0.6 with 27.3 g 50% $H_2SO_4$. The reaction mixture was stirred for several hours, then filtered through a medium-porosity filter funnel. It was washed with 100 ml water and 106 g filter cake (20.4% Mn, 5.92% Cs) and 350 ml filtrate containing 73 g/l $Cs_2SO_4$ were obtained which is another 38% cesium extraction. The total extraction of cesium from the $CsMnO_4$ was 88% leaving 12% in the $MnO_2$. Higher acid concentration did not improve the extraction yields significantly. The filtrate was pH-adjusted to 7 with a solution containing 79.7 g/l $Cs_2CO_3$. Any soluble two-valent manganese left was oxidized with a suitable oxidant ($CsMnO_4$, $H_2O_2$) precipitated as manganese oxide and removed by filtration. The filtrate was evaporated to dryness. The $Cs_2SO_4$ obtained was 99.4% pure.

EXAMPLE V 100 g $CsMnO_4$ (99.4% $CsMnO_4$, 21.68% Mn, 52.46% Cs) as prepared by the process of Example I or II was suspended in 400 ml $H_2O$ in a liter beaker. The suspension was stirred and heated to 65° C. and 12.7 g $CH_3OH$ in 12.7 ml water was gradually added within 45 minutes. The reaction mixture was stirred and kept at 60° C. for another 3 hours or until all seven-valent manganese was reduced to four-valent manganese. If the reaction is carried out at room temperature the reduction process will be extended. The solids were separated from the liquid by filtration through a medium-porosity buchner filter funnel. It is washed with 100 ml water, and 110 g filter cake(15.31% Cs, 0.08% Rb, 0.033% Na, 0.032% K, 0.016% Fe, 19.85% Mn) and 460 ml filtrate and wash (77.54 g/l Cs, 0.23 g/l Rb, 0.0014 g/l Na, 0.043 g/l K, 0.0005 g/l Mn) were obtained. The cesium extraction from the $CsMnO_4$ is at this point 68% and the molar ratio Mn:Cs in the filter cake is as 1:0.32.

The $Cs_2CO_3$ in the filtrate can be recovered as such or be converted into any suitable cesium compound by addition of the corresponding acid followed by evaporation and crystallization.

The 110 g filter cake were suspended in 220 ml of a solution containing 68.2 g/l $MnSO_4$. The reaction mixture was stirred and heated and kept at 50° C. for 10 hours. It was filtered through a medium-porosity buchner filter funnel, washed with 100 ml water and 155 g filter cake (17.6% Mn, 0.17% Cs) and 260 ml filtrate and wash (63.7 g/l Cs, 0.24 g/l Rb, 0.03 g/l Na, 0.032 g/l K) were obtained.

Any soluble two-valent manganese left was oxidized with a suitable oxidant ($CsMnO_4$, etc.), precipitated as manganese oxide and removed by filtration. Other manganese salts can be used in this ion exchange reaction such as $MnCl_2$, $MnNO_3$, $MnCO_3$, etc. to obtain the cesium salt needed. The filtrate was evaporated to dryness and 22.7 g $Cs_2SO_4$ (72.87% Cs, 0.11% Rb, 0.008% K, 0.0006% Na)were obtained. The extraction of cesium from the $CsMnO_4$ was 68% as $Cs_2CO_3$ and 31.5% as $Cs_2SO_4$ which totals 99.5%. The purity of the product was higher than 99.7%.

In the recovery of cesium from the cesium containing delta $MnO_2$, any compounds known to ion exchange alkali in alkali-containing delta $MnO_2$'s can be used. As for example compounds of zinc, calcium, barium, copper, cobalt, nickel, etc. being polyvalent metal salts of strong mineral acids.

I claim:
1. A process for recovering cesium from cesium alum, $CsAl(SO_4)_2$, comprising:
   (a) reacting cesium alum with a water-soluble permanganate in an aqueous reaction medium at a temperature above 35° C., at least 1.5 moles of permanganate ion being present per mole of cesium;
   (b) forming solid-phase cesium permanganate ($CsMnO_4$) as said reaction proceeds at a pH at which the aluminum sulfate remains in solution and continuing said reaction until substantially all of the cesium alum present has been converted to $CsMnO_4$, the final pH of said reaction medium being below a pH at which insoluble aluminum hydroxide forms; and
   (c) separating the resulting solid-phase $CsMnO_4$ from the residual solution to obtain cesium permanganate of high purity.

2. The process of claim 1 in which said aqueous reaction medium is at a temperature of from 40° to 80° C. during said reaction, said cesium alum being added as a solid to said aqueous solution which contains said permanganate, and said final pH being below 4.0.

3. The process of claim 1 in which said permanganate is potassium permanganate ($KMnO_4$).

4. The process of claim 1 in which said aqueous reaction medium contains salts of other alkali metals besides cesium.

5. The process of claim 1 in which said permanganate is present in an amount of from 1.8 to 2.5 moles of permanganate ion per mole of cesium.

6. A process for recovering cesium from cesium alum, $CsAl(SO_4)_2$, comprising:
   (a) adding solid cesium alum to an aqueous solution of a water-soluble permanganate, said solution being at a temperature of from about 40° to 80° C., from about 1.8 to 3.0 moles of permanganate ion being present per mole of added cesium;
   (b) forming precipitated cesium permanganate ($CsMnO_4$) as said cesium alum dissolves and reacts;
   (c) continuing said reaction until substantially all of the added cesium alum has dissolved and reacted, the final pH being below a pH at which insoluble aluminum hydroxide forms;
   (d) reducing the temperature of said solution to a temperature at which the cesium permanganate ($CsMnO_4$) remaining in solution precipitates; and
   (e) separating the resulting combined precipitate from the residual solution to obtain $CsMnO_4$ of high purity.

7. The process of claim 6 in which said permanganate is potassium permanganate ($KMnO_4$).

8. The process of claim 6 in which said aqueous solution at the conclusion of said reaction contains salts other than alkali metals besides cesium.

9. The process of claim 1 in which the separated $CsMnO_4$ precipitate is reacted with a permanganate reducing agent to obtain a cesium carbonate ($Cs_2CO_3$) solution and solid cesium delta manganese dioxide ($Cs_xMn_4O_{8-9}$ wherein x+0.8 to 2), and separating the cesium carbonate solution from the cesium delta manganese dioxide.

10. A process for recovering cesium from cesium alum, $CsAl(SO_4)_2$, comprising:

(a) adding solid cesium alum to an aqueous solution of a water-soluble permanganate, said solution being at a temperature of from about 40° to 80° C., from about 1.8 to 3.0 moles of permanganate ion being present per mole of added cesium;

(b) forming precipitated cesium permanganate ($CsMnO_4$) as said cesium alum dissolves and reacts and continuing said reaction until substantially all of the added cesium alum has dissolved and reacted, the final pH being below a pH at which insoluble aluminum hydroxide forms;

(c) reducing the temperature of said solution to a temperature at which the cesium permanganate ($CsMnO_4$) remaining in solution precipitates;

(e) separating the resulting combined precipitate from the residual solution to obtain $CsMnO_4$ of high purity; and (f) reacting the separated $CsMnO_4$ with a permanganate reducing agent to obtain a cesium carbonate ($Cs_2CO_3$) solution and solid, cesium delta manganese dioxide ($Cs_xMn_4O_{8-9}$ wherein $x=0.8$ to 2); and (g) separating the cesium carbonate solution from the cesium delta manganese dioxde.

11. The process of claim 10 in which said permanganate is potassium permanganate ($KMnO_4$) and said reducing agent is methanol.

12. The process of claim 10 in which the separated cesium delta manganese dioxide is reacted with an aqueous solution of a strong mineral acid to exchange the cesium for the hydrogen and obtain an aqueous solution of a cesium salt of the strong mineral acid.

13. The process of claim 10 in which the separated cesium delta manganese dioxide is reacted with an aqueous solution of a polyvalent metal salt of a strong mineral acid to exchange the polyvalent metal for the cesium and obtain an aqueous solution of the cesium.

* * * * *